(12) United States Patent
Williams et al.

(10) Patent No.: US 7,870,691 B2
(45) Date of Patent: Jan. 18, 2011

(54) GREEN ROOF TILE SYSTEM AND METHODS OF USE

(76) Inventors: David A. Williams, 703 E. 45th 1/2 St., Austin, TX (US) 78751; Jonathan W. Kinder, 3000 Bellaire Ranch, Apt. 1827, Fort Worth, TX (US) 76109

( * ) Notice: Subject to any disclaimer, the term of this patent is extended or adjusted under 35 U.S.C. 154(b) by 0 days.

(21) Appl. No.: 12/503,489

(22) Filed: Jul. 15, 2009

(65) Prior Publication Data

US 2010/0139184 A1 Jun. 10, 2010

(51) Int. Cl.
- *A01G 9/02* (2006.01)
- *E04D 13/18* (2006.01)
- *E04H 14/00* (2006.01)
- *E02B 3/14* (2006.01)

(52) U.S. Cl. .................. 47/65.9; 52/173.3; 405/20
(58) Field of Classification Search .............. 47/65.9; 52/173.3, 302.1; 405/19, 20
See application file for complete search history.

(56) References Cited

U.S. PATENT DOCUMENTS

| | | | |
|---|---|---|---|
| 4,197,684 A | | 4/1980 | Johnson |
| 4,222,208 A | | 9/1980 | Ferver |
| 4,227,829 A | * | 10/1980 | Landry, Jr. ............ 405/20 |
| 4,370,075 A | * | 1/1983 | Scales ................ 405/20 |
| 4,586,299 A | | 5/1986 | Bayer |
| 4,669,231 A | | 6/1987 | Bini |
| 4,671,699 A | | 6/1987 | Roach |
| 4,875,803 A | * | 10/1989 | Scales ................ 405/16 |
| 5,074,089 A | | 12/1991 | Kemmer |
| 5,108,222 A | * | 4/1992 | Jansson et al. ........... 405/20 |

(Continued)

FOREIGN PATENT DOCUMENTS

EP 0566562 B1 5/1995

(Continued)

OTHER PUBLICATIONS

"Vegetated roofs for stormwater management and multiple spatial scales," Timothy Carter and C. Rhett Jackson, Science Direct, Landscape and Urban Planning 80 (2007) 84-94, in revised form May 17, 2006; Accepted Jun. 22, 2006; Available online Jul. 27, 2006 [11 Pages].

(Continued)

*Primary Examiner*—Richard E Chilcot, Jr.
*Assistant Examiner*—Andrew J Triggs
(74) *Attorney, Agent, or Firm*—Jackson Walker LLP; Abimbola Bukoye

(57) ABSTRACT

Green roof systems are provided comprising a plurality of tile sheets. Each tile sheet in turn may comprise a plurality of tiles. The tiles are connected to one another by one or more bridges. The tile sheets may be disposed above a layer of growing medium. The tiles are spaced apart from one another so as to form a channel between each tile. The channels formed between the adjacent tiles are contiguous with neighboring channels and are arranged so as to form a circuitous pathway for water runoff. The channels so formed allow plant growth between each tile. Advantages of certain embodiments include improved strength, reduced weight, reduced costs, increased life spans, reduced maintenance, easier installation, improved building energy conservation, reduced urban island heat effect, improved sound insulation, improved water retention, improved environmental aspects, improved irrigation, and reduced erosion of the growing medium.

14 Claims, 6 Drawing Sheets

U.S. PATENT DOCUMENTS

| | | | |
|---|---|---|---|
| 5,268,028 A | | 12/1993 | Fifield |
| 5,556,228 A | * | 9/1996 | Smith .......................... 405/16 |
| 5,615,971 A | * | 4/1997 | Boev e ........................ 404/37 |
| 6,443,667 B2 | | 9/2002 | Brown |
| 6,606,823 B1 | | 8/2003 | McDonough et al. |
| 6,739,797 B1 | * | 5/2004 | Schneider ................... 404/35 |
| 6,862,842 B2 | | 3/2005 | Mischo |
| 7,001,101 B1 | * | 2/2006 | DeRose ....................... 404/40 |
| 7,344,334 B2 | * | 3/2008 | Thorkelson ................. 404/29 |
| 2004/0237439 A1 | | 12/2004 | Powell |
| 2005/0188643 A1 | | 9/2005 | McGrath |

FOREIGN PATENT DOCUMENTS

| | | |
|---|---|---|
| WO | 9003480 | 4/1990 |
| WO | 2004099515 A1 | 11/2004 |

OTHER PUBLICATIONS

"Appropriate Design Elements and Soil Selection for Green Roofs in North Central Texas," David Alexander Williams, submitted to the graduate faculty of the College of Science and Engineering, Texas Christian University, Dec. 2008 [64 Pages].

"Phytogeography of Rare Plant Species Endemic to the Southeastern United States," James C. Estill and Mitchell B. Cruzan, Department of Botany and Department of Ecology and Evolutionary Biology, University of Tennessee, Knoxville, Tennesse 37996-1100, Castanea 66(1-2): 3-23. Mar./Jun. 2001 [21 Pages].

"Public Health Effects of Inadequately Managed Stormwater Runnoff," Stephen J. Gaffield, PhD, Robert L. Goo, Lynn A. Richards, MSES, MPA, and Richard J. Jackson, MD, MPH, Sep. 2003, vol. 93, No. 9, American Journal of Public Health [7 Pages].

"Thermal performace of green roofs through field evaluation," K. Liu and B. Baskaran, Institute for Research in Construction (IRC), NRCC-46412, First North American Green Roof Infrastructure Conference, Awards and Trade Show, Chicagok, Illinois, May 29-30, 2003, pp. 1-10 [11 Pages].

"Recycling waste latex paint in concrete," Moncef Nehdi and Jon Sumner, Science Direct, Cement and Concrete Research 33 (2003) 857-863, Department of Civil and Environmental Engineering, Univeristy of Western Ontario, London, Ontario, Canada, Received May 15, 2002; Accepted Dec. 9, 2002 [7 Pages].

* cited by examiner

GREEN ROOF TILE SYSTEM AND METHODS OF USE

BACKGROUND

The present invention generally relates to green roof systems, also known as roof landscaping systems, living roof systems, and roof gardens, suitable for supporting live plant growth on building roofs. More particularly, the present invention relates to modular green roof systems and related methods of use.

Green roofs are typically found in non-arid environments or require irrigation to thrive. In hot/arid climates, water is often a limiting resource in green roof systems both because of limited total precipitation and increased evaporation from solar loading. Frequently, conventional green roof systems fail to retain adequate amounts of water. This inadequate retention of water can result in increased storm water runoff, which can adversely contribute to flooding, and which can result in less than optimal growing media water retention. Failure to retain water in the green roof system also limits the amount of water that can be efficiently transpired from the system over time.

A green roof is a roof of a building that is partially or completely covered with vegetation and soil, or a growing medium, usually planted over a waterproofing membrane. This does not refer to roofs which are merely colored green, as with green roof shingles. Benefits of green roof systems are numerous. For one, green roofs provide increased aesthetics due to the presence of flowers and other foliage. Green roof systems can be a source of fruits and vegetables as well. Additionally, green roof systems are generally beneficial from an energy conservation standpoint due to the improved insulation they provide. For example, green roof systems reduce heat loss during the winter months by adding additional insulation and thermal mass. They are, in fact, quite effective in reducing cooling loads during the summer, through shading the roof surface, and the evaporative cooling effects from evapotranspiration of plants and soils. In this way, green roof systems may reduce energy consumption and save costs through lower energy bills. Moreover, in addition to providing an energy savings benefit, insulation from green roof systems can provide an additional sound insulation benefit as well.

Green roof systems are also known to reduce ambient urban temperatures in the vicinity of the buildings on which they are installed. This effect, also known as the "urban heat island effect" can be rather dramatic, with some studies showing a decrease of up to 34° C. for roof top temperatures. In addition to a reduction of roof top temperatures, green roof systems are known to minimize diurnal temperature fluctuations of underlying roof structures. Green roof systems benefit the environment through multiple mechanisms, including by filtering pollutants and carbon dioxide out of the air and by filtering pollutants and heavy metals out of rainwater.

In some instances, green roof systems may be required or encouraged by local regulations or green roofs may ease compliance with local regulatory requirements, particularly with respect to storm water runoff requirements. By reducing storm water runoff, flooding and pressure on municipal stormwater systems may be reduced. In some cases, installation of green roof systems reduce required government fees.

Further, green roof systems have been known to increase the life span of a roof of up to 2-3 times, resulting in a lower lifetime cost and lower maintenance costs.

Nevertheless, numerous challenges are faced by conventional green roof systems. For example, many conventional green roof systems are heavily stressed by arid to semi-arid climates, due to high rates of water loss through evaporation from solar loading, often removing much of the plant-available water from the growing medium. Mulching is one method of preventing evaporation loss from the substrate by the addition of another layer of porous material on top of the substrate. Stone and gravel mulches are quite heavy, making them unsuitable for use in green roof systems. Organic mulch decomposes too quickly in hot climates and is also unsuitable for long-term use in green roof systems.

Often, conventional green roof systems are susceptible to damage from the conditions to which they are exposed, including high winds, hail, and overland surface flow of water. These conditions result in the loss of growing media, disturbance to the vegetative root zone, and in extreme conditions, sediment entrainment into wind currents can result in projectile damage to surrounding objects. Those green roof systems able to support sufficient vegetative or structural protection are often too heavy for many roofing applications, particularly retrofit applications where roofs are not built to handle significant additional loads.

Accordingly, improved green roof systems are needed to address one or more disadvantages of the prior art.

SUMMARY

The present invention generally relates to green roof systems, also known as roof landscaping systems, living roof systems, and roof gardens, suitable for supporting live plant growth on building roofs. More particularly, the present invention relates to modular green roof systems and related methods of use.

An example of a green roof tiling system comprises a plurality of tile sheets; wherein each tile sheet comprises at least three tiles; wherein, each tile in a tile sheet is connected to at least one other tile in the tile sheet by a bridge; wherein each tile comprises a substantially impermeable material; wherein the tile sheets are disposed above a growing medium layer; wherein each tile is spaced apart from adjacent tiles thereto so as to form a channel between each tile so as to allow plant growth between each tile; wherein the channels formed between the adjacent tiles are contiguous with neighboring channels; and wherein the channels are arranged with respect to one another so as to form a circuitous pathway for water runoff.

An example of green roof modular tiling sheet comprises a plurality of tiles wherein the plurality of tiles comprises at least three tiles; wherein each tile comprises a substantially impermeable material; one or more bridges wherein the one or more bridges interconnects one or more tiles; wherein each tile is spaced apart from adjacent tiles thereto so as to form a channel between each tile; and wherein the channels are arranged with respect to one another so as to form a circuitous pathway for water runoff.

An example of a method of forming of a green roof system comprises the steps of: providing a growing medium on a roof; disposing a plurality of tiles above the growing medium wherein each tile is interconnected to another tile by at least one bridge; wherein the plurality of tiles are spaced apart from one another so as to form a channel between each adjacent tile; wherein each channel is contiguous with at least one other channel so as to form a pathway for water runoff; and wherein the pathway deviates from a straight line.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
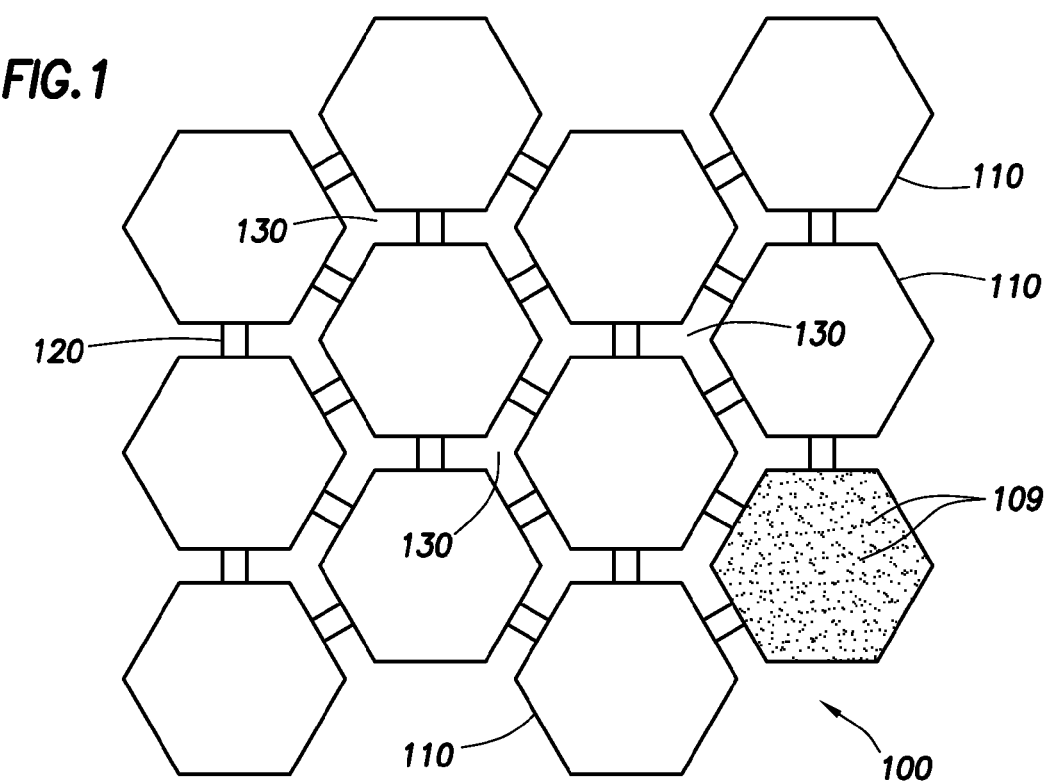
FIG. 1 illustrates a top view of a green roof system in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to green roof systems, also known as roof landscaping systems, living roof systems, and roof gardens, suitable for supporting live plant growth on building roofs. More particularly, the present invention relates to modular green roof systems and related methods of use.

In certain embodiments, green roof systems are provided herein which comprise a plurality of tile sheets. Each tile sheet in turn may comprise a plurality of tiles. The tiles are connected to one another by one or more bridges. The tile sheets may be disposed above a layer of growing medium such as soil. The tiles are spaced apart from one another so as to form a channel between each tile. The channels formed between the adjacent tiles are contiguous with neighboring channels. Further, the channels are arranged with respect to one another so as to form a circuitous pathway for water runoff. The channels so formed allow plant growth between each tile. The channels may be shaped and sized to accommodate easy planting of plants contained within standardized nursery potting vessels.

In certain optional embodiments, the tiles are formed of or coated with a substantially impermeable material. Mulch may be optionally incorporated in certain embodiments to improve water retention. Other features and elements are disclosed herein. Additionally, methods of use and methods of construction are also provided.

Advantages of certain embodiments of the present invention include, but are not limited to, improved strength, reduced weight, reduced costs, increased lifespans, reduced maintenance, and easier installation due to the modular design elements inherent to certain embodiments of the present invention. Other advantages of certain embodiments include improved building energy conservation including reduced cooling during the summer and reduced heating during the winter, reduced urban island heat effect, and improved sound insulation. Still other advantages may include improved environmental effects, through filtering pollutants and carbon dioxide from of the air and by filtering pollutants and heavy metals from rainwater. Additionally, green roof systems may be configured to reduce storm water runoff so as to reduce flooding. Certain embodiments are adapted to improve plant available water within the growing media for the plants contained therein. Certain embodiments are constructed with irrigation delivery systems integrated into the invention to simplify green roof installation and maintenance. Further, certain configurations of the present invention reduce erosion of growth media so as to maximize resources available for plant growth.

To facilitate a better understanding of the present invention, the following examples of certain embodiments are given. In no way should the following examples be read to limit, or define, the scope of the invention.

FIG. 1 illustrates a top view of a green roof system in accordance with one embodiment of the present invention. Tile sheet 100 comprises a plurality of tiles 110. In this embodiment, tiles 110 are connected to one another by one or more bridges 120. Tiles 110 are interconnected so as to form channels 130 between adjacent tiles. Although the perimeter of tiles 110 are shown here as hexagonal, the perimeter of tiles 110 may be in the shape of triangle, a polygon, or any shape regular or irregular. Moreover, the shape of tile 110 may take the form of any polyhedral shape, a cylindrical shape, or any regular or irregular three-dimensional shape.

Channels 130 are preferably configured to be skewed or nonlinear with respect to one another so as to provide a circuitous pathway for water runoff. By further arranging channels 130 so that they deviate from a straight line, water is forced along a nonlinear path, slowing its flow and increasing contact times between runoff water and growing media. In this way, water infiltration in the green roof system is improved.

As shown in FIG. 1, tiles 110 are connected to one another by one or more bridges 120. Bridges 120 may comprise members that individually attach each tile 110 to one another or may extend across a plurality of tiles 100. Tile sheet 100 may be composed in this fashion by interconnecting tiles 110 in a modular fashion. A plurality of tile sheets 100 may be joined to one another to further augment the size of a green roof system. In this way, installation is simplified by the modular nature of tile sheet 100. Here, the twelve tile sheet 100 is shaped so that other twelve tile sheets (not shown) can be placed around it without noticeable borders.

Interconnection of tiles 110 in this modular fashion also assures increased strength and overall integrity of system 100. Integrity of tile sheets 100 is particularly important during shipping and transport, installation, and in high wind conditions to prevent removal of all or a portion of tile sheet 100.

Tiles 110 may be formed partially or wholly of any material suitable for long-term exposure to the external conditions to which they are expected to be exposed. Furthermore, the material(s) selected for tile 110 should provide sufficient strength to maintain the structural integrity of tile sheet 100 without significant damage. Suitable materials of construction for tiles 110 include, but are not limited to ceramics, metals known in the art, alloys, ceramics, concrete, or any combination thereof. In certain embodiments, tiles 110 comprise a lightweight concrete and may optionally include a concrete strength modifier agent wherein the concrete strength modifier agent is selected from the group consisting of: minerals, carbon fibers, ground battery casings, ground tires, ground nut shells, glass, glass fibers, hollow glass beads, mica, ceramics, polymeric materials, polymeric beads, synthetic materials, polypropylene fibers, and mixtures thereof. The concrete strength modifying agent may take the physical shape of shavings, fibers, flakes, ribbons, rods, strips, spheroids, toroids, pellets, tablets, or any other physical shape. The lightweight concrete may also comprise a lightweight aggregate wherein the lightweight aggregate is selected from the group consisting of: pumice, vermiculite, perlite, fly ash, and expanded shale. Tiles 110 may also incorporate one or more additional beneficial agents including, but not limited to, slow release fertilizers. Slow release fertilizer 109 may be coated on the surface of tiles 110 or incorporated throughout tile 110 as desired.

In certain preferred embodiments, the lightweight concrete may have a density from about 31 lbs/ft$^3$ to about 115 lbs/ft$^3$. Lightweight concrete is advantageous in that it reduces the overall weight of the green roof system. A reduced weight of the green roof system allows the green roof system to be used on a larger range of buildings, particularly retrofit buildings that may not be designed to handle significantly larger roof loads. In this vein, tile sheet 100 may be configured to have an overall distribution of weight of no more than about 10 pounds per square foot of pressure when placed on a roof in certain embodiments.

Additionally, the configuration of tile sheet 100 may be adapted to provide additional insulation for energy conservation purposes and/or to provide additional sound insulation. In certain embodiments, each tile 110 has an R value greater than about 1 ft$^2$·° F.·h/Btu.

In one embodiment, each tile 110 measures about 9 inches long, about 1.5 inches tall. Here, the entire array forming the sheet 100 in this embodiment measures about 36 inches by about 36 inches. These dimensions represent one possible configuration; however, the design is scalable and could utilize more or fewer tiles or a different size of tiles. This specific modular geometry allows ease of transport and installation by one person. The removal of a single tile 110 provides ample space for larger plantings without excessive exposed soil. Tiles 110 may be further adapted to provide multiple planes of articulation, creating an interlocking pattern hiding any seams between tile sheets. Other possible geometries include, but are not limited to, examples shown in following figures included herein.

In certain embodiments, tiles 110 measure across from about 6 inches wide to about 18 inches wide, from about 6 inches long to about 18 inches long, and from about 1 inches thick to about 3 inches.

Figure 2:
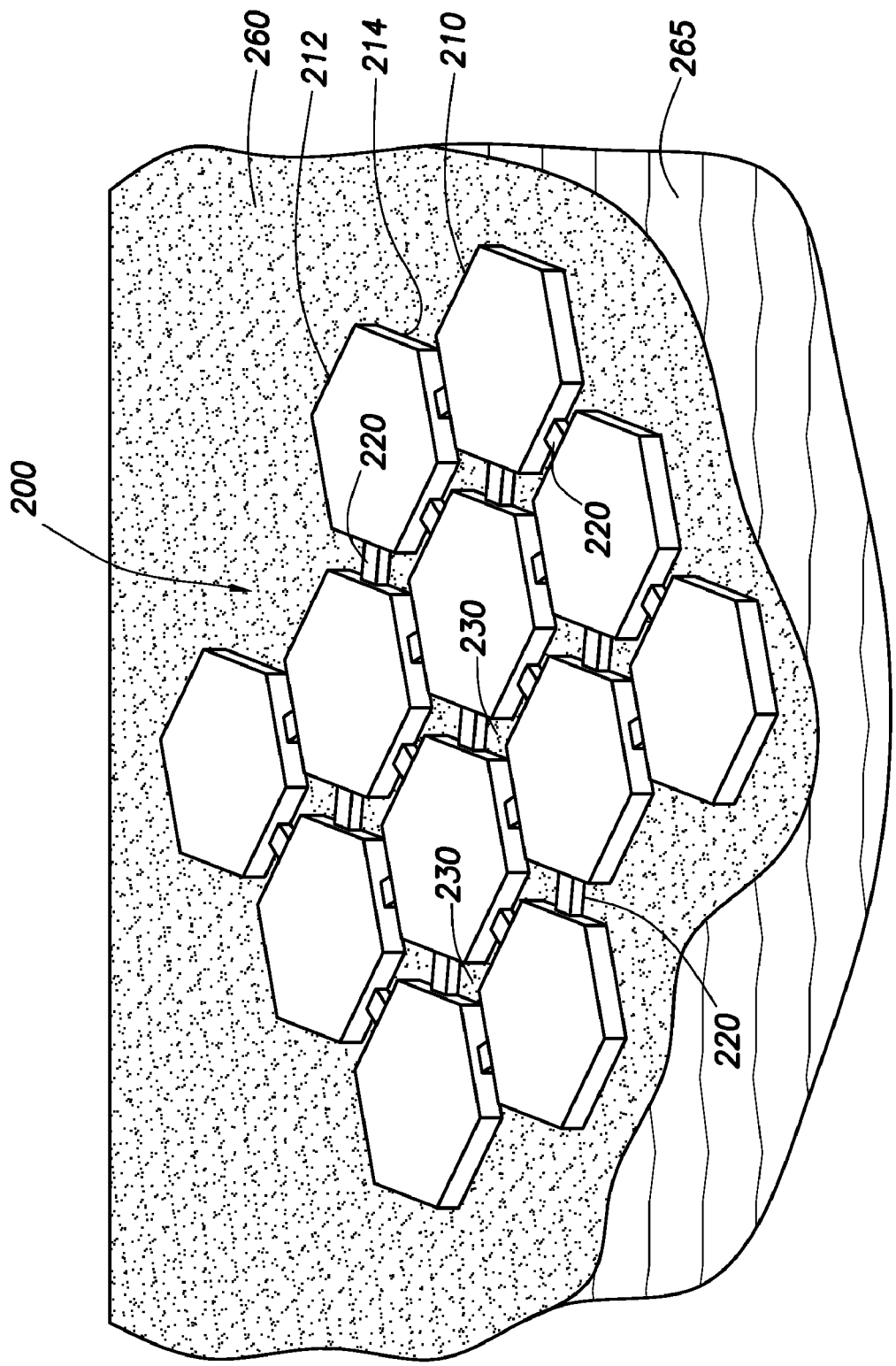
FIG. 2 illustrates a perspective view of one portion of a green roof system in accordance with one embodiment of the present invention.

FIG. 2 illustrates a perspective view of one portion of a green roof system in accordance with one embodiment of the present invention. Here, tile sheet 200 is shown situated on a layer of growing medium 260, which is further situated on top of roof 265. Growing medium 260 may comprise any medium suitable for growing plants. Examples of suitable growing medium include, but are not limited to, natural soil, expanded shale, pumice or other volcanic rocks, natural gravel, organic material, and various blends of these and other media. Growing medium 260 has a thickness sufficient to support the expected vegetation intended for the green roof system. In certain embodiments, the thickness of growing medium 260 extends at least about 2 inches.

Roof 265 may be any protective covering on top of a building, including flat roofs and pitched roofs. Roof 265 may be a roof specially adapted to incorporate a green roof system or roof 265 may be a roof that is retrofitted to receive a green roof system.

As before, tiles 210 are connected or otherwise attached to one another by bridges 220 so as to form channels 230 between tiles 210. In this particular example, bridges 220 are shown as 1 inch by 1 inch by 1 inch of material. In certain embodiments, bridges 220 may vary from about 0.5 inches wide to about 2 inches wide, from about 0.5 inches long to about 3 inches long, and from about 0.5 inches tall to about 3 inches tall. The shape of bridge 220 shown in FIG. 2 is intended to be nonlimiting as it is explicitly recognized that bridges 220 may take the form of any connective shape including, but not limited to, cylinders and polyhedrons. In the geometry shown here in FIG. 2, connective bridges 220 are flush with lower surface 214 of tiles 210 so that surface storm water runoff is impeded from flowing underneath bridges 220, but are not flush with the upper surface 212 of tiles 210. This configuration allows rainwater to flow off tiles 210 and flow along the channels 230, flowing over the connective bridges 220 much like water over the spillway of a dam. Any path that the storm water takes along these channels 220 is forced through non-linear paths so as to slow its velocity and so as to increase infiltration thereof into the soil medium. Bridges 220 between tiles 210 also act as miniature dams, increasing friction between the fluid and channel surface further slowing the flow of water along channels 230. In this way, each bridge 220 has a profile adapted to allow water to pass through each channel 230 without substantial impediment. For convenience of installation and reconfiguration of tile sheet 200, bridges 220 may be adapted to be detachable in certain configurations. To further improve water retention, tiles 210 may comprise a water absorbent material so as to absorb water, further reducing storm water runoff.

In certain embodiments, tile sheets 200 are offset from one another. When tile sheets are installed on a sloping surface such as a pitched roof, tile sheets are arranged such that the upper tile sheet borders half of the two sheets beneath it, straddling the seam between them so as to ensure that the tiles of each tile sheet do not align along a downhill gradient. This arrangement is beneficial where the water-slowing features described above is desired.

In certain embodiments such as the one depicted here in FIG. 2, tiles 210 may be formed with upper surface 212 of each tile substantially parallel to lower surface 214 of each tile. Tile surfaces 212 and 214 are capable of other profiles as will be apparent from the following figures and disclosure.

Under some environmental conditions, it may be desirable to construct tiles 210 to have a solar reflectance conducive to minimizing heat absorption so as to reduce building heating costs. For example, in certain embodiments, it may be desirable to construct tiles 210 with a solar reflective index (SRI) value of at least about 29. Under other environmental conditions, a low solar reflective index value may be desirable. For example, solar reflective index values from about 1 to about 20 may be desirable in colder climates.

Leaching minerals may also be incorporated into the material of construction of tiles 210. Leaching minerals refer to minerals from within the material the tiles are made, which may leach into the growth medium over time. For example, with concrete, calcium carbonate may be leached from the concrete to the growing medium or soil over time, which can help to buffer the pH of the soil against acid rain, as well as replace calcium carbonate lost over time from the soil. This leaching ability of tiles 210 may be highly advantageous when local plant communities evolve around limestone derived/influenced soils.

Additionally, channels 230 between tiles 210 may be filled with a filtering medium to provide filtration of water flowing through channels 230. Examples of suitable filtering media include, but are not limited to, loose charcoal or charcoal packets shaped like the channels themselves. The filtering medium could be replaced once a year or so as desired. Biological filtration in the soil usually occurs with or without the addition of activated charcoal and usually continues to happen as long as the soil remains healthy.

Figure 3:
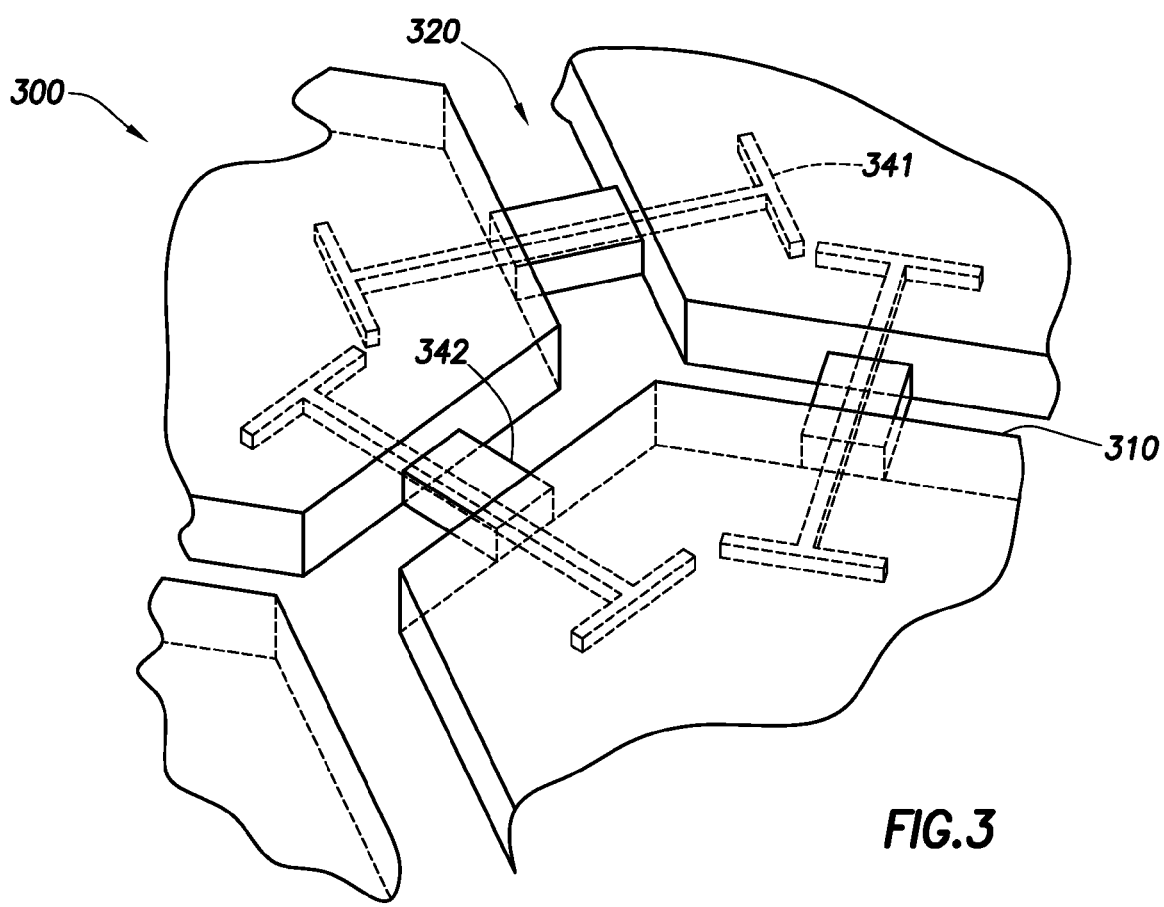
FIG. 3 illustrates a partial perspective view of a green roof system of one possible method for providing reinforcement to the linking bridges between tiles in accordance with one embodiment of the present invention.

FIG. 3 illustrates a partial perspective view of a green roof system of one possible method for providing reinforcement to the linking bridges between tiles in accordance with one embodiment of the present invention. This figure allows visualization of the inside of tiles 310. Normally, the reinforcing members will not be visible from the outside of the tile 310.

Bridges 320 may comprise any material suitable to attach tiles 310 to one another such that tiles 310 remain attached to one another under expected external forces and environmental conditions.

In this embodiment, bridges 320 comprise reinforcing member 341 and reinforcing shell 342. In certain embodiments, reinforcing member 341 may be a rigid to semi-rigid member introduced into a curable material when wet and allowed to cure inside of tile 310 and/or reinforcing shell 342. Reinforcing members 341 may be made of many different types of materials, including but not limited to, aluminum, steel, plastic, wood, paper, or any combination thereof. Optional reinforcing shells 342 may comprise option A, option B, option C, option D, or any combination thereof. In certain embodiments, reinforcing shells 341 are comprised out of the same material as tiles 310.

Reinforcing members 342 may also be flexible rather than being rigid so as to allow articulation of tiles 310 with respect to one another. In certain embodiments, reinforcing members 342 may be adapted to allow reinforcing shells 342 between tiles 310 to be broken while reinforcing members 342 remain intact. Whether the reinforcing members 341 are rigid or flexible, they provide additional tensile strength to the joints between tiles 310. In some configurations, tile sheet 300 could have the rigid, reinforcing shells broken and become a flexible sheet able to conform to surface contours. It is explicitly recognized that other shapes or materials are possible provided that they offer sufficient rigidity to the structure of the sheet.

Figure 4:
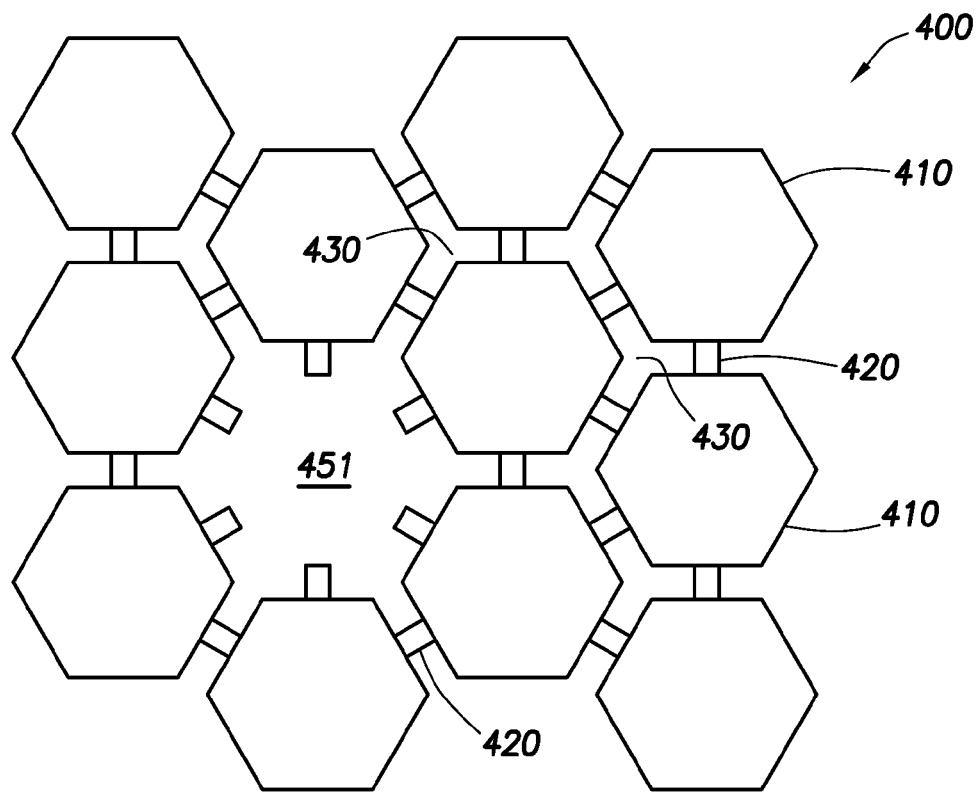
FIG. 4 illustrates a top view of a green roof system, having a tile removed to allow more space for larger plantings in accordance with one embodiment of the present invention.

FIG. 4 illustrates a top view of a green roof system, having a tile removed to allow more space for larger plantings in accordance with one embodiment of the present invention. Any tile(s) 410 may be removed from tile sheet 400 to allow landscape design flexibility during installation such as open space 451 for example. Additionally, tiles 410 may also be removed to allow proper fitting when objects on a roof might impede placement of an entire tile sheet 400. This removal of a tile may be particularly desirable for plants not able to thrive in channels 430 formed between tiles 410. The modular design of these sheets of tiles allows for landscape design creativity and allows for desirable arrangement of channels 430 for directing the path for storm water runoff. Bridges 420 that connect tiles 410 may be severed to reconfigure tile sheet 400 as desired.

Figure 5:
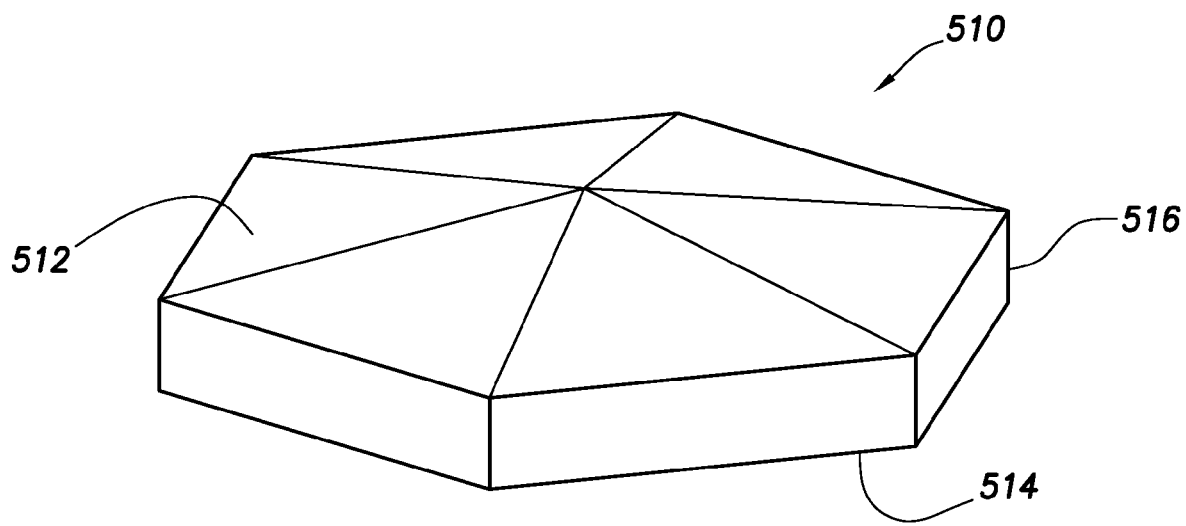
FIG. 5 is a perspective view of a one possible example numerous possible tile surfaces.

FIG. 5 is a perspective view of a one possible example numerous possible tile surfaces. Here, a single hexagonal tile with a convex surface is shown. Upper convex surface 512 is a surface geometry that will shed water quickly into the surrounding soil and plants. Many different surface geometries and textures of tile 510 are possible, including but not limited to convex, concave, natural stone, and flat. Surfaces can be designed several ways, including but not limited to flat, concave, convex, undulating, or molded from actual rock. Tiles 510 could be tailored to mimic any natural stone surface. Concave surfaces may be advantageous to retain additional water by pooling water on the surface of tile 510.

In some embodiments, upper surface 512 and lower surface 514 are parallel to each other. When tiles 510 have uncurved sides, sides 516 of each tile 510 are preferably parallel but not in direct contact to the sides of other nearby tiles so as to allow channels to be formed between adjacent tiles.

Figure 6:
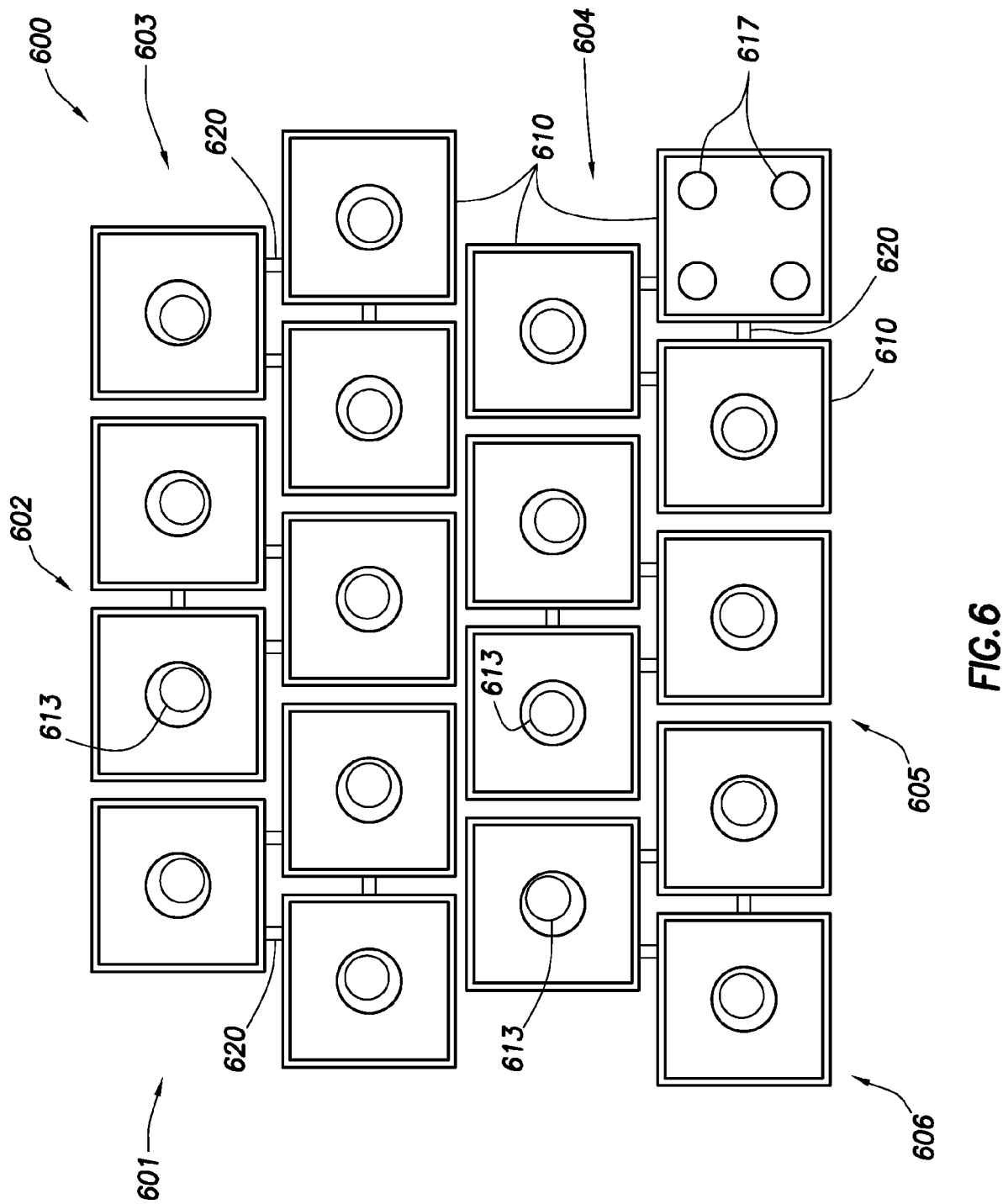
FIG. 6 is a top view of one example of structural geometries and surface options within the spirit of this invention.

FIG. 6 is a top view of one example of structural geometries and surface options within the spirit of this invention. Here, green roof system 600 comprises first tile sheet 601, second tile sheet 602, third tile sheet 603, fourth tile sheet 604, fifth tile sheet 605, and sixth tile sheet 606. Each tile sheet 601-606 shown in FIG. 6 comprises three tiles 610, although any number of tiles could be used. As before tiles 610 are connected to one another by one or more bridges 620.

Tiles 610 comprise a hole 613 substantially in the center of each tile 610. Hole 613 extends from the upper surface to the lower surface of tile 610. Hole 613 may provide an additional path for water runoff and/or provide an area for plant placement. Tiles 610 are sloped in the immediate vicinity of hole 613 to collect precipitation and guide it into hole 613 so as to allow watering of the plant therein. This configuration focuses incident precipitation to the root zone of the plant in the center of the tile 610. This configuration also allows water a place to pool if precipitation rates exceed infiltration rates, thus creating a head of pressure which will increase the rate of infiltration. Again, this arrangement is but one example of how a lightweight, green roof, tile-mulching system may be configured. Other arrangements include a plurality of holes in tile 610 such as holes 617 for example.

When weight considerations are an issue for a green roof installation, it is desirable that these tiles be lightweight. Lightweight concrete consisting of Portland cement with well known lightweight aggregates, like pumice, vermiculite, pearlite, or expanded shale, is an example of a material that meets these requirements. A matrix made from these materials would be easy to source and casting methodologies are well understood, however lightweight concrete is only one of many possible matrix solutions.

Tile sheets 601-606 may be mass produced using production quality molds. Palettes of tiles can be shipped to a job, or the molds can be shipped and production carried out near the site of installation. Once on site, the lightweight nature of these tile sheets makes hoisting and manual installation much easier than a heavier product would.

Tile sheets 601-606 may be installed after the growing media of the roof is in place and any seeding has been done. Roofs with existing vegetation may need trimming before tile installation. Tiles may be broken out anywhere within the pattern to allow for larger plantings while smaller plantings may be placed within cracks between tiles if no previous planting has been done.

Many green roofs are simply flat roofs on the tops of warehouses; In such installations, a row of tile sheets is installed on either the down slope or up slope edge of the roof. Additional rows can offset from one another, in some cases, by about a ½ sheet, much like how brick are arranged in a brick wall. The edges of these sheets may need to be trimmed for a correct fit, and this may be accomplished by breaking the connections between tiles and severing any reinforcement therein. Sloped roofs and peaks have similar installation techniques. More complex contours may require flexible connections between tiles, as mentioned in discussion corresponding to FIG. 3 above.

Figure 7:
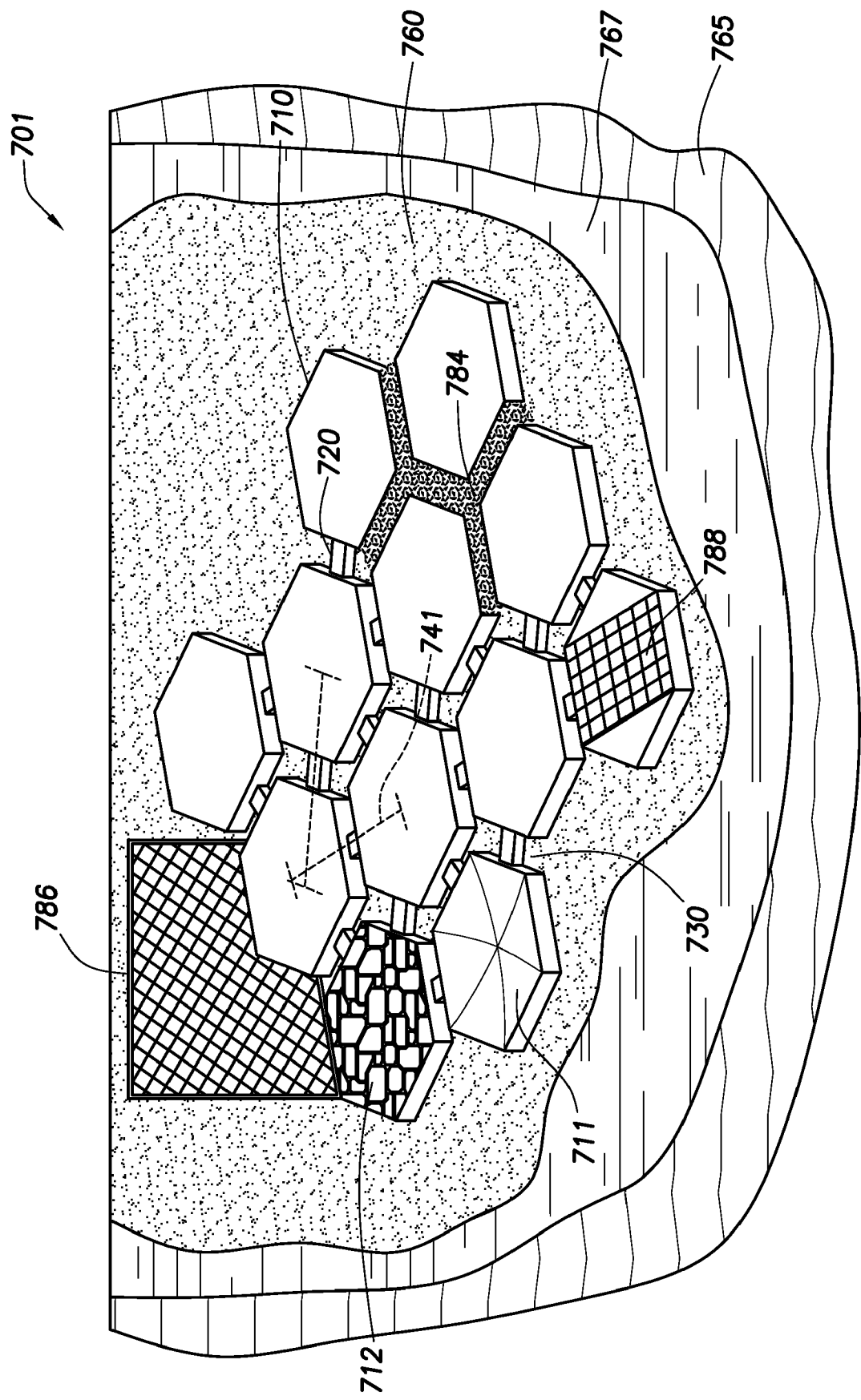
FIG. 7 illustrates another perspective view of a plurality of tile sheets in accordance with one embodiment of the present invention having certain optional features.

FIG. 7 illustrates another perspective view of a plurality of tile sheets in accordance with one embodiment of the present invention having certain optional features. Tile sheet 701 comprises tiles 710, which are attached to one another by bridges 720. Bridges 720 further comprise reinforcing members 741 for providing additional tensile strength to tile sheet 701.

As can be seen in FIG. 7, tiles 710 may comprise alternate shapes such as substantially concave upper surface 711 or natural rock facade upper surface 712. Other layers or components may be added to the upper surface of tiles 710 or otherwise incorporated into tiles 710 such as solar cells 788. Solar cells 788 may be desirable for the conversion of solar energy to electricity through photovoltaic cells or for conversion of solar energy to heating energy such as solar heating cells for heating water.

Tile sheet 701 may be disposed on growing medium 760, which is further disposed on top of waterproofing layer 767, which is further situated on top of pitched roof 765. Waterproofing layer 767 may also provide additional protective functions such as acting as a root barrier.

Additional growing medium may be added to channels 730 as desired. One or more types of seeds may be added or otherwise incorporated into growing medium 760. Alternatively or in addition to the seeds in growing medium 760, plantings and vegetation may be added directly to growing medium 760.

In certain embodiments, layer of mulch 784 may be added to the surface of growing medium 760. Mulch layer 784 is a protective cover placed over the growing medium or soil, primarily to modify the effects of the local climate. A wide variety of natural and synthetic materials may be used. Examples of suitable mulch include, but are not limited to, grass clippings, leaves, hay, straw, shredded bark, whole bark nuggets, sawdust, shells, wood chips, shredded newspaper, cardboard, wool, crushed stone, pebbles, compost, rubber mulch such as from recycled tire rubber, plastic mulch such as where vegetation is allowed to grow through slits or holes in thin plastic sheeting, rock and gravel, or any combination thereof. The main functions of mulches are the conservation of soil moisture and the moderation of soil temperature. Mulch moderates internal soil temperatures by retaining heat from the day and radiating it to the soil at night during spring and fall. In the winter, mulches moderate soil warming during the day, limiting the stress plants undergo during soil freezing and thawing cycles. They may also be used to prevent frost heaving of unestablished plants in winter. During summer, they keep soil cool by blocking direct sunlight exposure of the soil surface. Mulches may also be used to block evaporation of water from the soil, slowing down soil drying. They also help control the growth of weeds, blocking sunlight and/or smothering weed seedlings under layers of material. Mulch also prevents soil erosion from heavy rains, reducing surface run-off of water.

Vertical support 786 is provided to provide a framework upon which climbing plants may grow. Vertical support 786 may be a lattice framework or any vertical support, including a post or plurality of posts suitable for encouraging the growth and spread of climbing plants.

Figure 8A:
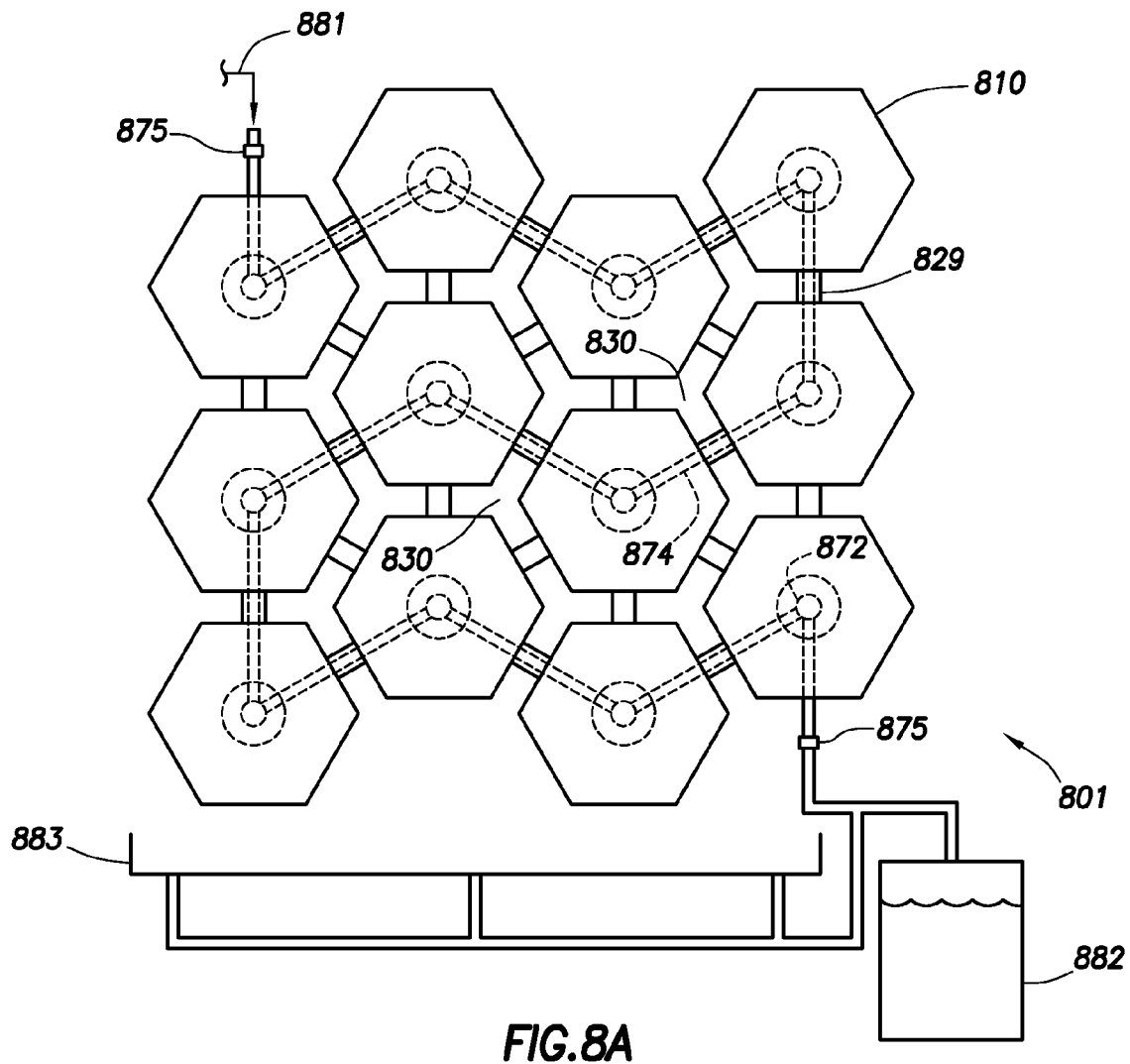
FIG. 8A illustrates a top view of a green roof system, having an irrigation system in accordance with one embodiment of the present invention.

FIG. 8A illustrates a top view of a green roof system, having an irrigation system in accordance with one embodiment of the present invention. Tile sheet 801 incorporates irrigation lines 874, which transport water throughout the area covered by the green roof system. Connections 875 are provided for water supply 881 and an optional water return line to collection vessel 882.

In certain embodiments, irrigation lines 874 may be optionally perforated so as to allow water to be dispersed throughout the soil area. Drip emitters or sprayers 872 may optionally be provided throughout the tile sheet 801 to disperse or otherwise deliver water to the green roof area.

Excess water may be recovered via collection vessel 882 from irrigation lines 874. Additionally, collection vessel 882 may also collect storm-water runoff or excess irrigation water via collection trough 883.

Figure 8B:
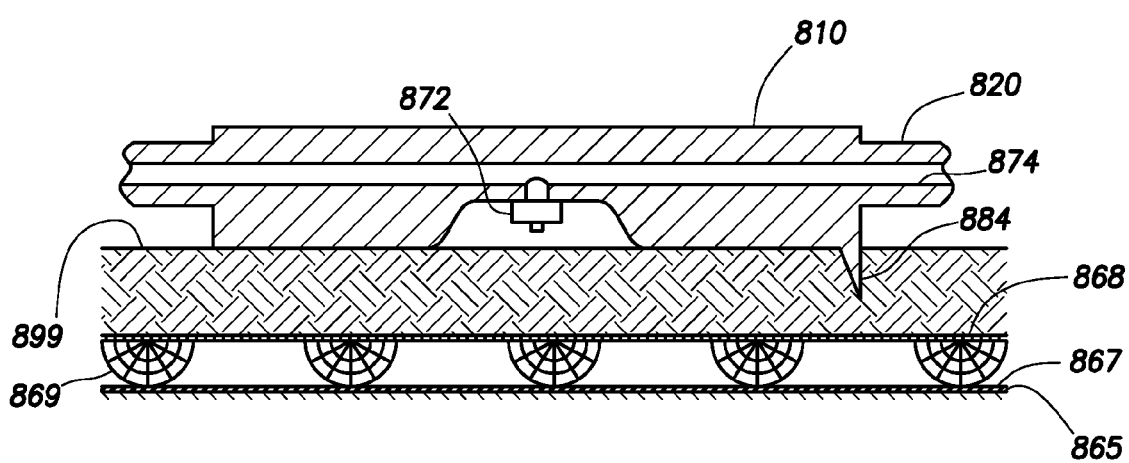
FIG. 8B illustrates a cross-sectional view of one tile having an irrigation system incorporated therein in accordance with one embodiment of the present invention.

FIG. 8B illustrates a cross-sectional view of one tile having an irrigation system incorporated therein in accordance with one embodiment of the present invention.

A cross-section of tile 810 is shown in FIG. 8B having irrigation line 874 passing through tile 810. Drip emitter or sprayer 872 is mounted on an underside recess of tile 810 for dispersing water to soil 899.

Retention element 884 is shown incorporated into tile 810 for securing tile 810 to soil 899. Retention element 884 may comprise a spike, a baffle, or any friction element suitable for resisting lateral movement of tile 810.

Here, soil 899 is disposed on drainage matt 868. Drainage matt 868 is a porous layer through which water may flow. Spacers 869 provide an offset from waterproofing layer 867 so as to create a channel between spacers 869 and waterproofing layer 867 through which water may flow. In this way, water may flow more freely along the length of pitched roof 865 than if the water were forced to flow through soil 899. In the embodiment depicted in FIG. 8B, spacers 869 are shown as inverted wire-frame geodesic domes, although spacers 869 may take any form suitable to providing an offset from waterproofing layer 867 or roof 865 so as to create a channel therebetween.

It is explicitly recognized that the green roof systems disclosed herein may be applied directly to a ground surface and in this way, provide a "roof tiling system" for a ground surface. Any of the elements or methods described herein may be directly applied to a green roof system applied to any surface, irrespective of whether that surface is situated on top of a building structure.

Methods of constructing and using the green roof systems described herein are also contemplated as part of the present invention. In certain embodiments, a protective layer may be optionally be disposed on a flat or sloped roof. A drainage matt may also be optionally incorporated into the green roof system so as to aid in collection or discharge of irrigation or rain water.

A growing medium such as soil may then be added to provide a base layer to support plant growth. Seeds may be already incorporated into the growing medium or may be added after deposition of the growing medium layer.

One or more tile sheets may then be added until desired coverage of the roof is achieved. Tile sheets may be added as integrated modular units or as individual tiles which are later assembled on site. As described above, additional growing medium or mulch may be added to the channels formed between adjacent tiles.

In certain embodiments, it may be desirable to partially bury one or more tiles in the growing medium to further embed tile sheet in place. Partially burying the tiles may also protect from water undercutting tiles.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A green roof tiling system comprising:
    a tile sheet comprising at least three tiles intended to be disposed above a growing medium layer disposed on a roof;
    a plurality of detachable bridges connecting adjacent tiles in the tile sheet;
    a substantially impermeable material included in at least some of the tiles; and
    a plurality of plant growth channels between adjacent tiles, wherein the plant growth channels include a pathway for water runoff.

2. The green roof tiling system of claim 1, wherein each tile has an upper surface, a lower surface substantially parallel to the upper surface, and a plurality of side surfaces, and wherein the side surfaces form a perimeter in the shape of at least one of: an irregular polygon, an octagon, a heptagon, a hexagon, a pentagon, a rectangle, a triangle, and an ellipse.

3. The green roof tiling system of claim 2, wherein the upper surface of each tile forms a surface given by at least one of: a substantially planar surface, a substantially convex surface, and a substantially concave surface.

4. The green roof tiling system of claim 2, wherein each tile has one or more holes that extends from the upper surface to the lower surface.

5. The green roof tiling system of claim 2, wherein a solar panel is affixed to the upper surface of at least one of the tiles, and wherein one or more of the channels terminate in a water storage vessel for collection of water runoff.

6. The green roof tiling system of claim 5, wherein the solar panel is at least one of: a photovoltaic panel and a solar water heating panel.

7. The green roof tiling system of claim 2, further comprising:
    a drainage matt adapted to support the growing medium layer, wherein the drainage matt is adapted to elevate the growing medium layer above one or more water proofing layers disposed on the roof;
    at least one waterproofing layer disposed on the roof; and
    a retention element affixed to the underside of at least one of the tiles, wherein the retention element comprises at least one of: a friction surface, a spike, and a baffle.

8. The green roof tiling system of claim 2, further comprising:
    a water filtering medium disposed in one or more of the channels.

9. The green roof tiling system of claim 2, wherein at least some of the tiles further comprise a support configured to support climbing plants.

10. A method of forming of a green roof system comprising:
    disposing a plurality of tiles above a growing medium on a roof, wherein each tile is interconnected to another tile by at least one bridge; and
    spacing the plurality of tiles apart from one another so as to form channels between adjacent ones of the plurality of tiles, wherein at least some of the channels are contiguous with other channels so as to form a pathway for water runoff, and wherein the pathway deviates from a straight line.

11. The method of claim 10, wherein the roof further comprises one or more waterproofing layers disposed thereon, and further comprising:
    disposing one additional growing medium after said disposing the plurality of tiles, wherein the one additional growing medium is directed to the channels.

12. The method of claim 10 further comprising:
    covering at least some of the growing medium in the channels with a surface mulching layer.

13. The method of claim 10 further comprising:
    embedding the plurality of tiles within the growing medium.

14. The method of claim 10 further comprising:
    seeding at least a portion of the growing medium with a plurality of seeds; and
    providing an irrigation system for irrigation of the growing medium.

* * * * *